US009625026B2

(12) United States Patent
Cochren et al.

(10) Patent No.: US 9,625,026 B2
(45) Date of Patent: Apr. 18, 2017

(54) LOCKING DIFFERENTIAL ASSEMBLY

(71) Applicant: Eaton Corporation, Cleveland, OH (US)

(72) Inventors: Steven J. Cochren, Commerce Township, MI (US); Daniel Stanley Frazier, Kalamazoo, MI (US); Chad Robert Hillman, Ceresco, MI (US); John Kimmel Vandervoort, Delton, MI (US)

(73) Assignee: Eaton Corporation, Cleveland, OH (US)

( * ) Notice: Subject to any disclaimer, the term of this patent is extended or adjusted under 35 U.S.C. 154(b) by 52 days.

(21) Appl. No.: 14/564,993

(22) Filed: Dec. 9, 2014

(65) Prior Publication Data

US 2015/0204431 A1 Jul. 23, 2015
US 2016/0319925 A9 Nov. 3, 2016

Related U.S. Application Data

(63) Continuation of application No. PCT/US2014/012702, filed on Jan. 23, 2014.
(Continued)

(51) Int. Cl.
*F16H 48/34* (2012.01)
*F16H 48/08* (2006.01)
(Continued)

(52) U.S. Cl.
CPC ............. *F16H 48/34* (2013.01); *F16H 48/08* (2013.01); *F16H 48/24* (2013.01);
(Continued)

(58) Field of Classification Search
CPC ......... F16H 2048/085; F16H 2048/204; F16H 2048/346; F16H 48/08; F16H 48/20;
(Continued)

(56) References Cited

U.S. PATENT DOCUMENTS 4,959,043 A * 9/1990 Klotz .................. F16H 48/08
475/220
5,523,684 A * 6/1996 Zimmermann ........ G01D 5/147
324/207.2
(Continued)

FOREIGN PATENT DOCUMENTS

JP H01161701 A * 6/1989 ............... H01F 7/16
JP 2005337321 12/2005
JP 2011033117 2/2011

OTHER PUBLICATIONS

Sudo Noriyuki, Feb. 17, 2011, JPO, Machine Translation.*

*Primary Examiner* — Erin D Bishop
*Assistant Examiner* — Lori Wu
(74) *Attorney, Agent, or Firm* — Dierker & Kavanaugh, P.C.

(57) ABSTRACT

A locking differential assembly includes a differential case defining an axis of rotation and a gear chamber. A first side gear is at a first end of the differential case. A second side gear is at a second end of the differential case opposite the first end for selectable rotation relative to the differential case. At least two pinion gears are rotatably supported in the gear chamber in meshing engagement with the first side gear and the second side gear. A solenoid is at the first end. A plunger is selectably magnetically actuatable by the solenoid. A lock ring is selectably engagable with the second side gear to selectably prevent the side gear from rotating relative to the differential case. At least two relay rods are each connected to the plunger and to the lock ring to cause the lock ring to remain a fixed predetermined distance from the plunger.

22 Claims, 10 Drawing Sheets

Related U.S. Application Data (60) Provisional application No. 61/755,939, filed on Jan. 23, 2013.

(51) Int. Cl.
  *F16H 48/24* (2006.01)
  *F16H 48/20* (2012.01)

(52) U.S. Cl.
  CPC .. *F16H 2048/085* (2013.01); *F16H 2048/204* (2013.01); *F16H 2048/346* (2013.01)

(58) Field of Classification Search
  CPC .......... F16H 48/22; F16H 48/24; F16H 48/30; F16H 48/34; F16H 48/38; B60K 23/04; B60K 23/08; B60K 2023/046; B60K 17/16
  See application file for complete search history.

(56) References Cited

U.S. PATENT DOCUMENTS

| | | | |
|---|---|---|---|
| 6,016,883 A | 1/2000 | Yamada | |
| 6,551,209 B2 | 4/2003 | Cheadle et al. | |
| 6,692,396 B1 * | 2/2004 | Grogg | F16H 48/08 137/539 |
| 6,958,030 B2 | 10/2005 | DeGowske | |
| 7,264,569 B2 * | 9/2007 | Fox | F16H 48/24 475/241 |
| 8,109,853 B2 | 2/2012 | Povirk et al. | |
| 2005/0279607 A1 * | 12/2005 | Fusegi | F16D 27/118 192/84.96 |
| 2006/0073931 A1 * | 4/2006 | Teraoka | F16H 48/08 475/231 |
| 2007/0142157 A1 * | 6/2007 | Nofzinger | F16H 48/08 475/231 |
| 2008/0042791 A1 * | 2/2008 | York | F16H 48/08 335/296 |
| 2008/0122436 A1 * | 5/2008 | Pinkos | B60K 17/16 324/207.21 |
| 2009/0247350 A1 | 10/2009 | Donofrio et al. | |
| 2012/0244987 A1 * | 9/2012 | Haugeberg | F16H 48/24 475/233 |
| 2012/0252621 A1 * | 10/2012 | Seidl | B60K 6/52 475/150 |
| 2013/0237363 A1 * | 9/2013 | Fusegi | F16H 48/24 475/230 |
| 2014/0004988 A1 * | 1/2014 | Yamanaka | F16H 48/22 475/231 |
| 2014/0110211 A1 * | 4/2014 | Andonian | F16D 11/14 192/69.8 |

* cited by examiner

LOCKING DIFFERENTIAL ASSEMBLY

CROSS-REFERENCE TO RELATED APPLICATIONS

This application is a continuation of International Application S.N. PCT/US1204/012702, filed Jan. 23, 2014, which itself claims the benefit of U.S. Provisional Application Ser. No. 61/755,939, filed Jan. 23, 2013, which is incorporated by reference herein in its entirety.

BACKGROUND

A locking differential may have an additional capability compared to a conventional "open" automotive differential. A vehicle with a locking differential may experience increased use of traction at the drive wheels compared to a vehicle with an "open" differential. Use of traction may be increased by restricting each of the two drive wheels on an axle to the same rotational speed without regard to the available traction or the road path taken at each wheel. The locking differential causes both wheels on an axle to turn together as if on a common axle shaft.

An open differential, or unlocked locking differential allows each wheel on an axle to rotate at different speeds. When a vehicle negotiates a turn, the wheel on the smaller (inner) radius rotates more slowly than the wheel on the larger (outer) radius. Without the unlocked or open differential, one of the tires may scuff in a turn. With an open differential, when one wheel of an axle is on a slippery road surface, the wheel on the slippery surface may tend to spin while the other wheel may not have enough torque applied to it to move the vehicle. For example, some vehicles with open differentials may be unable to climb a hill with wet ice under one of the wheels no matter how dry the pavement is under the other wheel (this may be known as a split-mu surface).

In contrast, a locked differential forces wheels on both sides of the same axle to rotate together at the same speed. Therefore, each wheel can apply as much torque as the wheel/road traction and the powertrain capacity will allow. In the example of the vehicle on the hill with the split-mu surface, a locked differential may allow the vehicle to climb the hill that is impossible for an otherwise identical vehicle to climb with an open differential. Locking differentials may also provide better traction that leads to improved vehicle performance under certain conditions, for example in drag racing, or snow plow operations.

Some vehicles have differentials that may be reconfigured from an unlocked state to a locked state. Such vehicles may be operated with the differential in the unlocked state for normal conditions, for example, to prevent tire scuffing in turns, and reconfigured for operation with a locked differential when wheel slippage is encountered.

SUMMARY

A locking differential assembly includes a differential case defining an axis of rotation and a gear chamber. A first side gear is at a first end of the differential case. A second side gear is at a second end of the differential case opposite the first end for selectable rotation relative to the differential case. At least two pinion gears are rotatably supported in the gear chamber in meshing engagement with the first side gear and the second side gear. A solenoid is at the first end. A plunger is selectably magnetically actuatable by the solenoid. A lock ring is selectably engagable with the second side gear to selectably prevent the side gear from rotating relative to the differential case. At least two relay rods are each connected to the plunger and to the lock ring to cause the lock ring to remain a fixed predetermined distance from the plunger.

BRIEF DESCRIPTION OF THE DRAWINGS

Features and advantages of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

The present disclosure relates generally to locking differentials, and more particularly to electronically controlled locking differentials used in vehicle drive axles. As used herein, an electronically controlled locking differential means a differential that changes between an unlocked state and a locked state in response to an electronic signal. In the locked state, both axle shafts connected to the differential rotate together in the same direction, at the same speed. The electronic signal may be automatically produced in response to a vehicle condition, for example, detection of wheel slippage. The electronic signal may also be produced in response to a demand from an operator, for example, an operator may press a button on a control panel of the vehicle.

Examples of the present disclosure may allow the differentials to operate at a higher torque than similarly sized existing locking differentials. The time to actuate the locking mechanism may also be reduced compared to existing electronic locking differentials. Further, the status indicator may provide a more satisfactory user experience by providing more detailed and accurate information regarding the operation of the electronically controlled locking differential system of the present disclosure.

Figure 1:
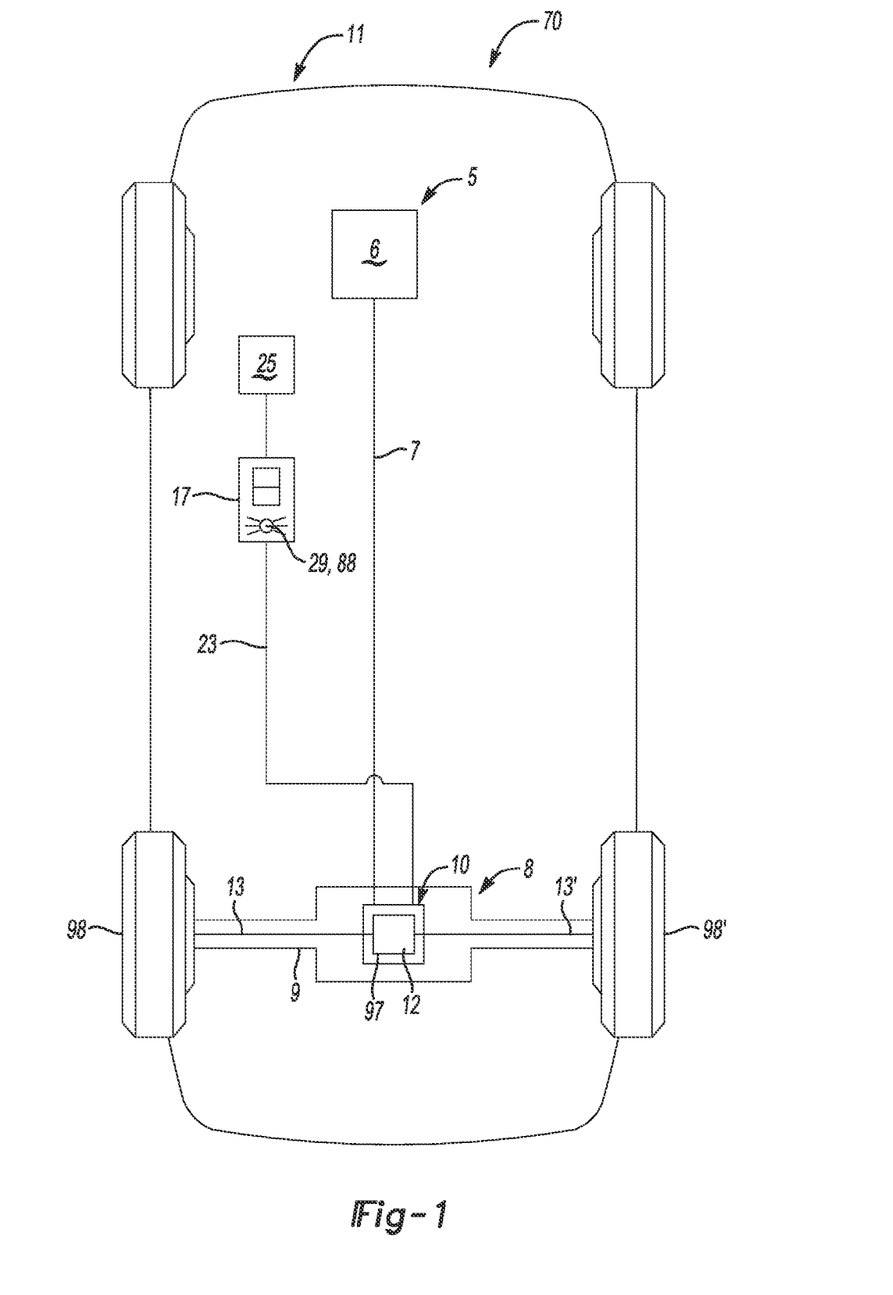
FIG. 1 is a schematic view of a vehicle with a locking differential system according to an example of the present disclosure.

Referring to FIG. 1, a powertrain 5 for a vehicle 70 includes a motor 6, a propeller shaft 7 connected to the motor and an axle assembly 8. The propeller shaft 7 is connected, for example, by gearing (not shown) to rotationally drive the axle shafts 13, 13' inside the axle housing 9. The axle assembly 8 includes the axle housing 9, a locking differential assembly 10 supported in axle housing 9 and the axle shafts 13, 13' respectively connected to first and second drive wheels 98 and 98'. A gearset 97 disposed within a differential case 12 transfers rotational power from differential case 12 to the axle shafts 13, 13', and selectably allows relative rotation between the axle shafts 13 and 13'. Although the locking differential assembly 10 depicted in FIG. 1 is applied to a rear-wheel drive vehicle, the present disclosure may be used in transaxles for use in front-wheel drive vehicles, transfer cases for use in four-wheel drive vehicles or in any vehicle powertrain.

Figure 2:
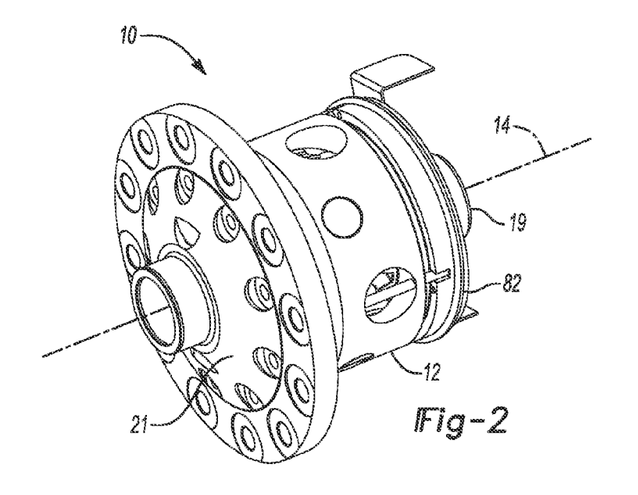
FIG. 2 is a perspective view of a locking differential according to an example of the present disclosure.
Figure 3A:
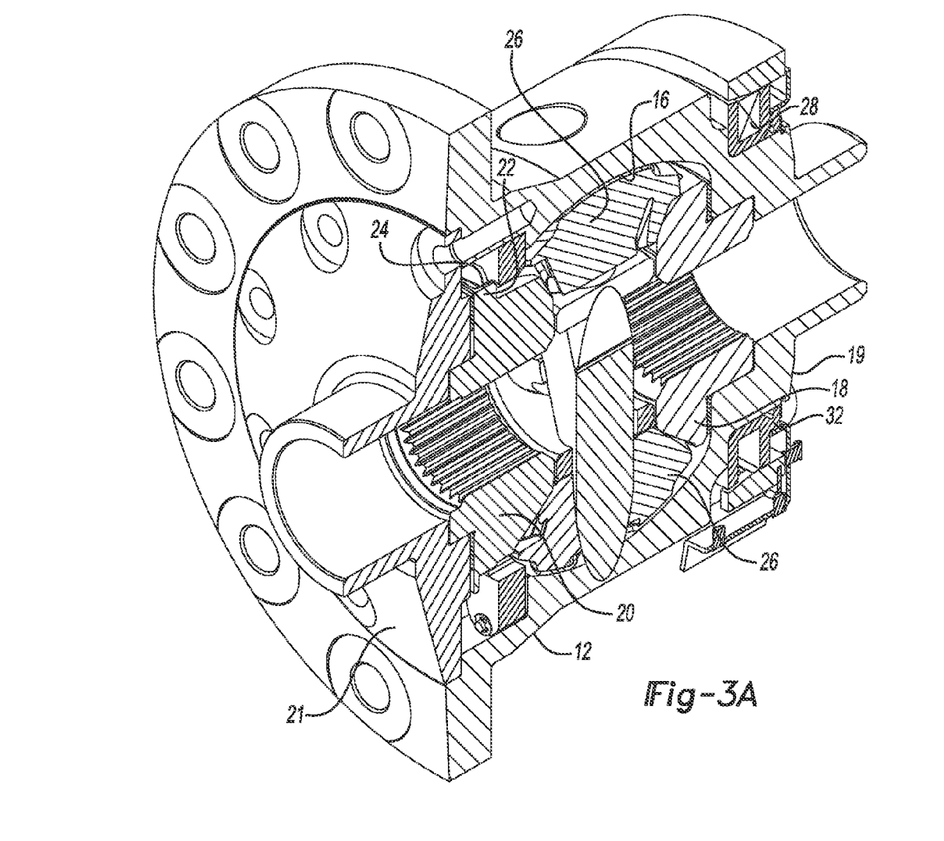
FIG. 3A is a cross-sectional perspective view of the locking differential depicted in FIG. 2.
Figure 3B:
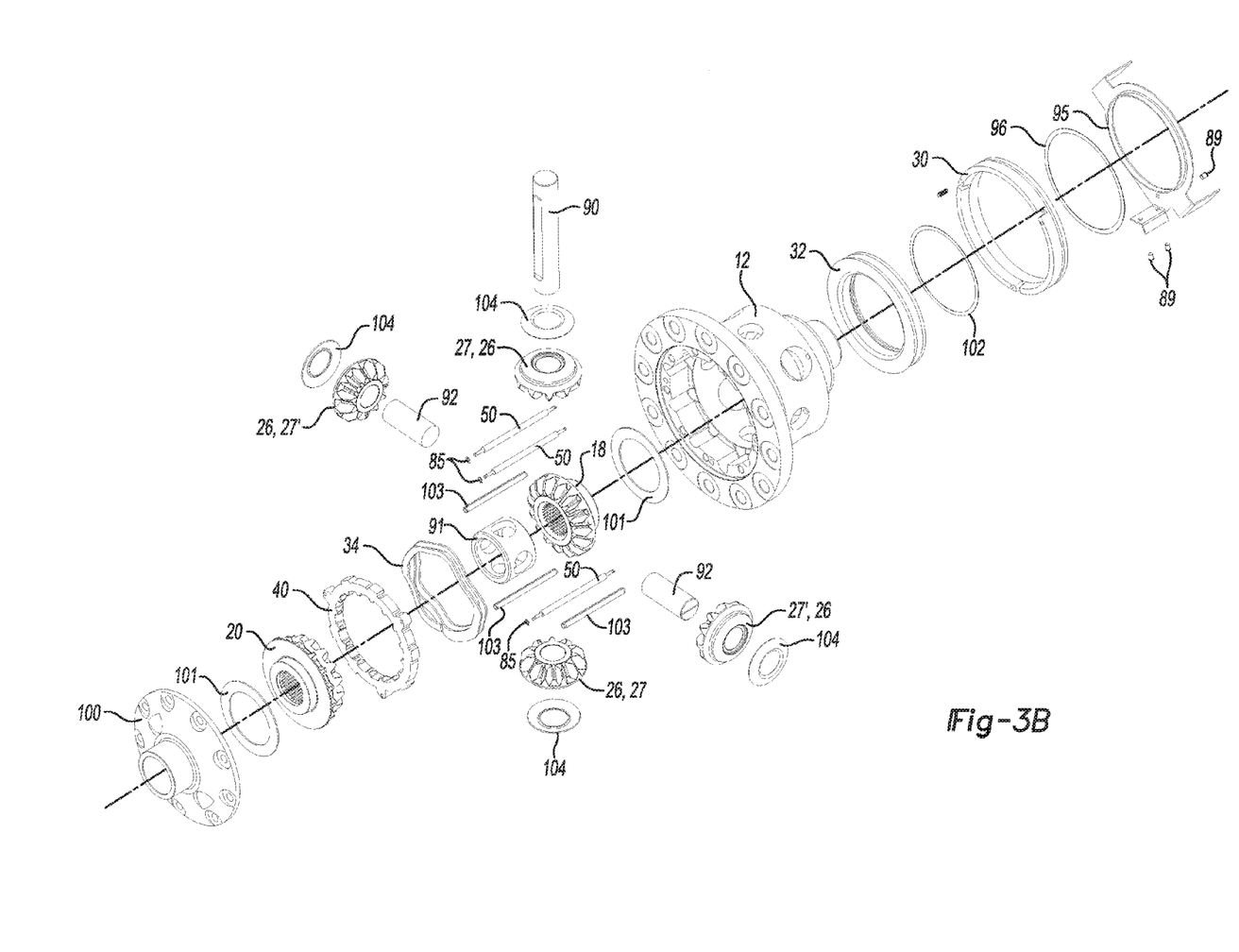
FIG. 3B is an exploded view of the locking differential depicted in FIG. 2.

Referring to FIGS. 2, 3A and 3B together, an example of the present disclosure is depicted including a locking differential assembly 10. The locking differential assembly 10 has a differential case 12 defining an axis of rotation 14 and a gear chamber 16. The differential case 12 rotates in the axle housing 9 (see FIG. 1) about the axis of rotation 14. A first side gear 18 is disposed at a first end 19 of the differential case 12 for selectable relative rotation thereto. A second side gear 20 is disposed at a second end 21 of the differential case 12 opposite the first end 19 for selectable rotation relative to the differential case 12.

The second side gear 20 has side gear dogs 22 defined on an outside diameter 24 of the second side gear 20 parallel to the axis of rotation 14. At least two pinion gears 26 are rotatably supported in the gear chamber 16. Each of the at least two pinion gears 26 is in meshing engagement with the first side gear 18 and the second side gear 20.

Figure 4:
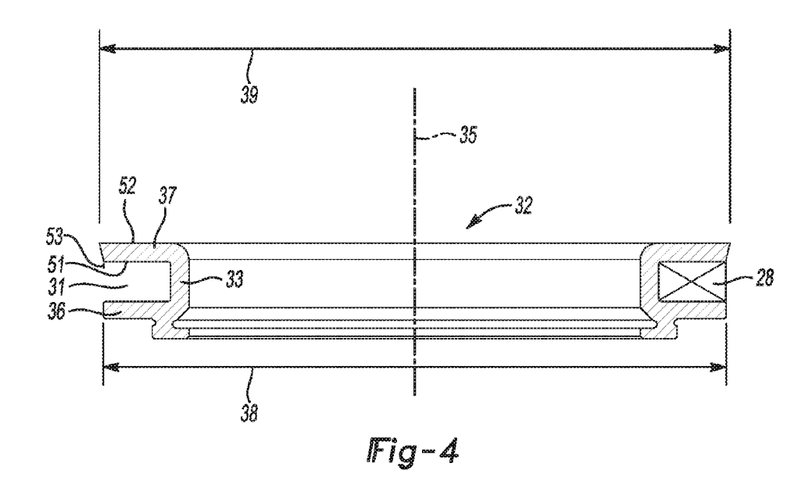
FIG. 4 is a cross-sectional side view of an example of a stator according to the present disclosure.

The locking differential assembly 10 includes a solenoid 28, disposed at the first end 19 of the differential case 12. The stator 32 is formed from a ferromagnetic material. The differential case 12 is rotatable relative to the stator 32 about the axis of rotation 14. As depicted in FIG. 4, the stator 32 has an annular wall 33 with a longitudinal axis 35 coaxial with the axis of rotation 14. Although the annular wall 33 depicted in FIG. 4 is a cylindrical wall, and the longitudinal axis 35 is a cylindrical axis, the annular wall 33 may deviate from a cylindrical shape in examples of the present disclosure. The annular wall 33 may, for example, have a larger diameter at one or both ends, or the annular wall 33 may have an arcuate section. A first stator annular flange 36 extends radially from the annular wall 33 to a first outer diameter 38 of the first stator annular flange 36. Although FIG. 4 depicts the first stator annular flange 36 extending perpendicularly to the longitudinal axis 35, the angle that the annular flange 36 makes with the longitudinal axis 35 may deviate from 90 degrees. For example, the angle may be 45 degrees such that the bobbin is wider at the first outer diameter 38 than at an interface between the first stator annular flange 36 and the annular wall 33. The angle between the first stator annular flange 36 and the annular wall 33 may be any angle.

A second stator annular flange 37 extends from the annular wall 33. The second stator annular flange 37 is spaced from the first stator annular flange 36 and may be parallel to the first stator annular flange 36. The second stator annular flange 37 is frustoconical with an inner base annular surface 51 opposite the first stator annular flange 36. An outer base annular surface 52 is distal to the first stator annular flange 36. The inner base annular surface 51 has an outer edge diameter 53 equal to the first outer diameter 38. The outer base annular surface 52 has a second outer diameter 39 greater than the first outer diameter 38. The first stator annular flange 36, the annular wall 33 and the second stator annular flange 37 together define an integral bobbin 31 for the solenoid 28. Although FIG. 4 depicts the integral bobbin having a substantially rectangular cross section, the surfaces may be rounded or canted in examples of the present disclosure. The solenoid 28 is directly wound onto the stator 32. Directly winding the solenoid 28 onto the stator 32 is facilitated by having the integral bobbin 31 open between the first outer diameter 38 and the second outer diameter 39. The stator 32 with the integral bobbin 31 of the present disclosure differs from other stators that open axially. A stator that opens axially may require that the solenoid be wound on a separate bobbin and slid into the axial opening. The space required for the separate bobbin is space that is not available for solenoid windings. Even if a so-called bobbinless coil is used, the additional manufacturing steps required to create the separate coil and then install the coil into the stator may be less desirable than the stator 32 with the integral bobbin 31 of the present disclosure.

FIG. 3B depicts a spring 34 disposed between the differential case 12 and the lock ring 40 to bias the lock ring 40 toward the disengaged position 44. A cover 100 is shown at the second end 21 of the locking differential assembly 10. A side gear thrust washer 101 is disposed between the cover 100 and the second side gear 20. Another side gear thrust washer 101 is disposed between the differential case 12 and the first side gear 18. Thrust washers 104 are disposed between the pinion gears 26 and the differential case 12. Shaft anchor roll pins 103 are inserted through the differential case 12 and the cross-shaft 90 and the stub shafts 92 to retain the cross-shaft 90 and stub shafts 92 for supporting the pinion gears 26. Stator retaining ring 102 is inserted into a groove in the differential case 12 to prevent the stator from moving axially relative to the differential case 12.

Figure 3C:
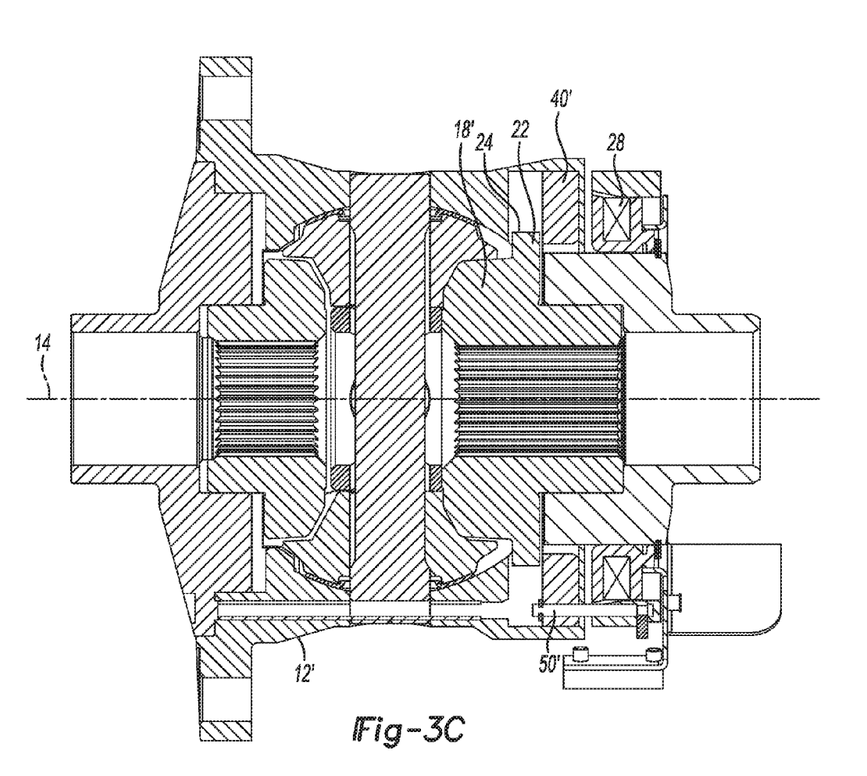
FIG. 3C is a cross-sectional view of a locking differential with the lock ring on the same side as the solenoid.

FIG. 3C is a cross-sectional view of a locking differential with the lock ring 40' on the same side as the solenoid 28. The first side gear 18' has side gear dogs 22 defined on an outside diameter 24 of the first side gear 18' parallel to the axis of rotation 14. The lock ring 40' is the same as the lock ring 40 in the example depicted in FIG. 3A. The relay rods 50' are shorter in the example depicted in FIG. 3C compared to the relay rods 50 in the example depicted in FIG. 3A. FIG. 3C depicts a differential case 12'.

Figure 5A:
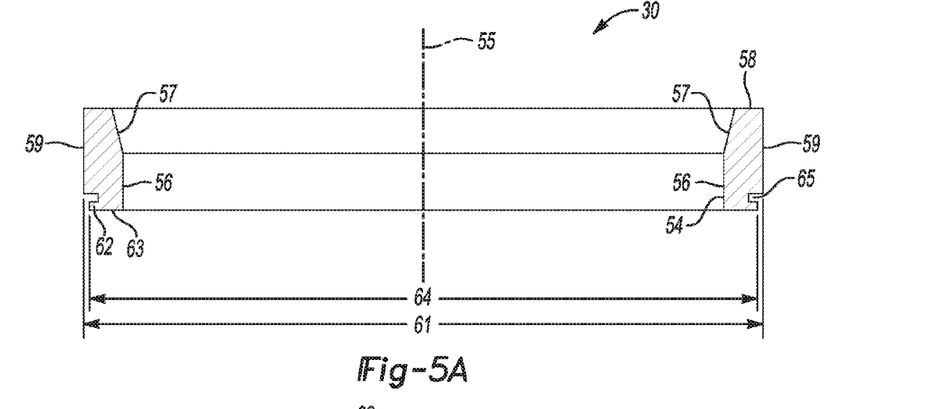
FIG. 5A is a cross-sectional side view of an example of a plunger according to the present disclosure.
Figure 5B:
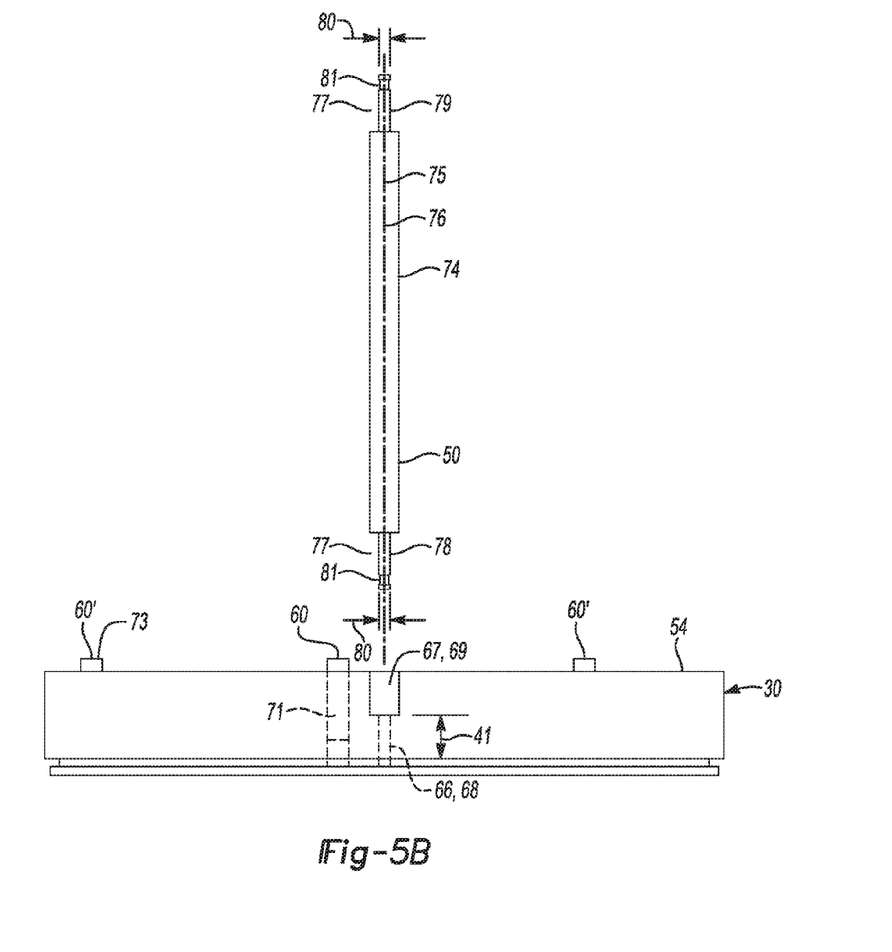
FIG. 5B is an exploded side view of an example of a plunger and a relay rod according to the present disclosure.

Referring to FIGS. 5A and 5B, in examples of the present disclosure, a plunger 30 is selectably magnetically actuated by the solenoid 28 (see FIG. 3A). The plunger 30 has a ferromagnetic cylindrical body 54. The ferromagnetic cylindrical body 54 has a cylindrical body axis 55 defined by the ferromagnetic cylindrical body 54 to be aligned with the axis of rotation 14. The ferromagnetic cylindrical body 54 has an inner wall 56 with an annular bevel 57 at a beveled end 58 of the ferromagnetic cylindrical body 54. The ferromagnetic cylindrical body 54 further includes an outer wall 59 having a plunger outer diameter 61. An annular plunger flange 62 is defined at a plunger end 63 distal to the beveled end 58. The annular plunger flange 62 has a plunger flange diameter 64 smaller than the plunger outer diameter 61. An annular notch 65 is defined by the ferromagnetic cylindrical body 54 and the annular plunger flange 62.

In an example, the plunger 30 is fixed for rotation with the differential case 12, and the plunger 30 is selectably translatable relative to the differential case 12 along the axis of rotation 14 (see FIGS. 2, 3A, 7A and 7B). The rotating plunger 30 rotates relative to the stator 32. Contact between the plunger 30 and the stator 32 may lead to galling of the plunger 30, the stator 32 or both.

Referring back to FIGS. 5A and 5B, in examples of the present disclosure, the locking differential assembly 10 may include a spacer 60, 60' disposed between the plunger 30 and the differential case 12 to prevent the annular bevel 57 of the inner wall 56 from contacting the second stator annular flange 37. In an example, the spacer 60 may be a threaded rod 71 adjustably screwed into the plunger 30 to set a predetermined gap 72 (see FIG. 7B) between the annular bevel 57 and the second stator annular flange 37. In another example, the spacer 60' may be a plurality of spaced raised bosses 73 on the beveled end 58 of the ferromagnetic cylindrical body 54.

A plurality of relay rod attachment bores 66 are defined in the ferromagnetic cylindrical body 54. A plurality 67 of relay rod access slots 69 are each defined in the beveled end 58 of the ferromagnetic cylindrical body 54 at each relay rod attachment bore 68. Each relay rod attachment bore 68 is substantially centered in the respective relay rod access slot 69. A shortest distance between the relay rod access slot 69 and the annular notch 65 is equal to the lock ring thickness 41. Such equality of dimensions allows each of the relay rods 50 to have end-to-end symmetry.

At least two relay rods 50 are each connected to the plunger 30 and to the lock ring 40 to cause the lock ring 40 (see FIG. 6C) to remain a fixed predetermined distance from the plunger 30.

The at least two relay rods 50 each include a cylindrical rod portion 74 having two ends 77, the cylindrical rod portion 74 defining a longitudinal rod axis 75 at a center 76 of the cylindrical rod portion 74. The relay rods 50 each have a first post 78 and a second post 79 each having a smaller diameter 80 than the cylindrical rod portion 74 defined at a respective one of the two ends 77. The first post 78 and the second post 79 are each concentric with the cylindrical rod portion 74. An annular groove 81 is defined on the first post 78 and the second post 79. The first post 78 and the second post 79 are substantially identical, and the relay rod 50 is symmetrical end-to-end. In other words, during assembly, the relay rods 50 may be installed without regard to which end is installed in the plunger 30 and which end is installed in the lock ring 40. In FIG. 5B, the first post 78 and the second post 79 are given different reference numbers for clarity in describing FIG. 5B, however, the first post 78 is identical to the second post 79. The first post 78 is depicted as being retained in a respective relay rod attachment bore 68 by a retention ring 82 disposed in the annular notch 65 of the plunger 30 protruding into the annular groove 81 of the first post 78.

Figure 6A:
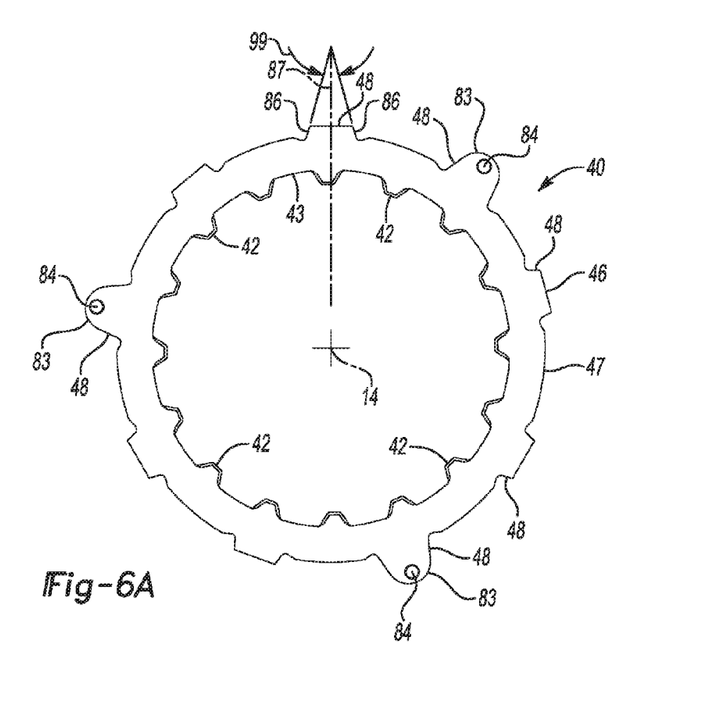
FIG. 6A is a plan view of an example of a lock ring according to the present disclosure.
Figure 6B:
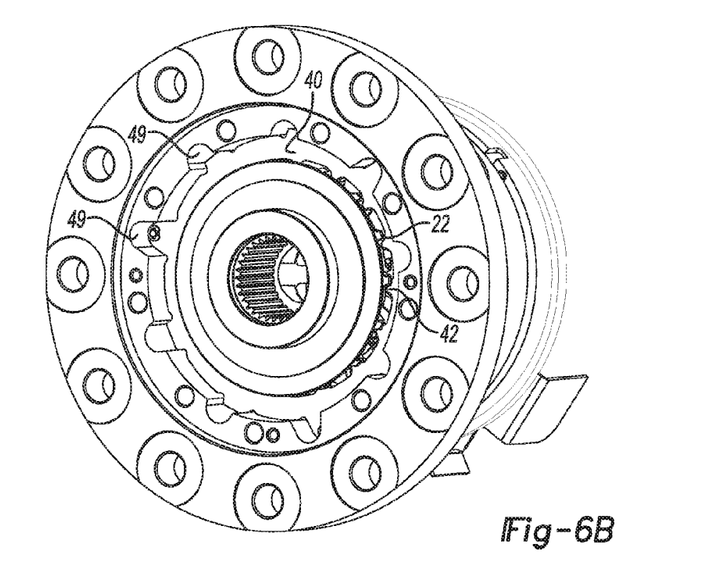
FIG. 6B is a perspective view of an example of a locking differential with an end cover removed according to the present disclosure.
Figure 6C:
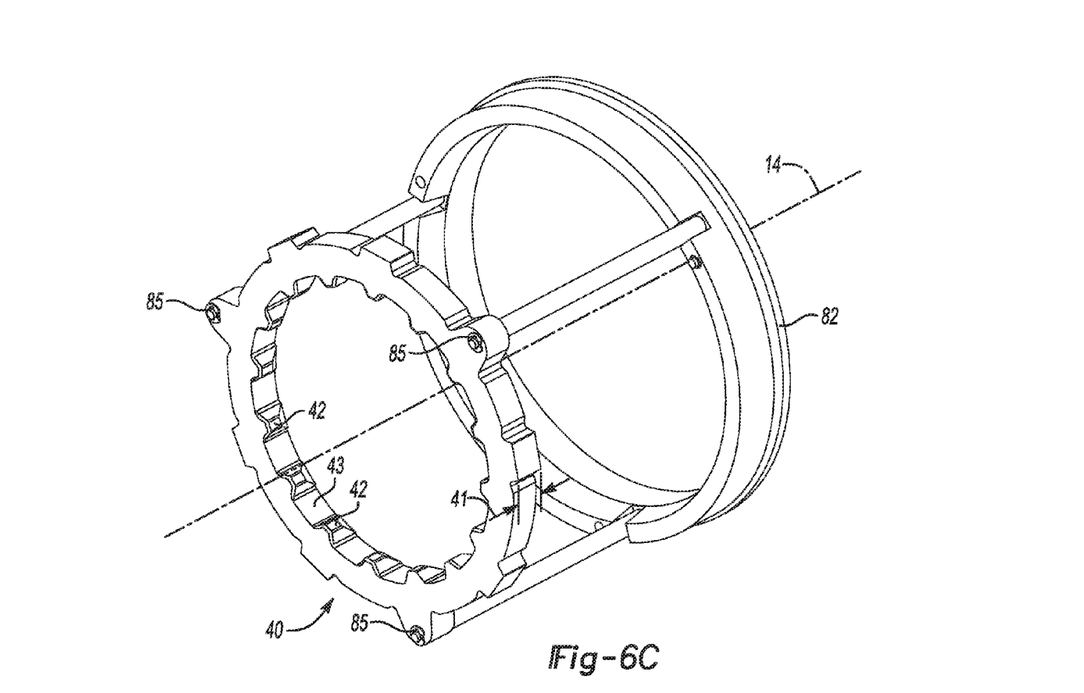
FIG. 6C is a perspective view of an example of a lock ring, relay rods and a plunger assembled as in the locking differential depicted in FIG. 2.

Referring now to FIGS. 6A, 6B, and 6C together, in examples of the present disclosure, the locking differential assembly 10 has a lock ring 40. The lock ring 40 includes complementary dogs 42 defined around an inside surface 43 of the lock ring 40. The complementary dogs 42 are selectably engagable with the side gear dogs 22 by translating the lock ring 40 along the axis of rotation 14 from a disengaged position 44 to an engaged position 45. The lock ring 40 has a plurality of lugs 46 defined on an outside surface 47 of the lock ring 40. Each lug 48 is to slide in a respective complementary slot 49 defined in the differential case 12 to guide the translation of the lock ring 40 between the engaged position 45 and the disengaged position 44. (See FIGS. 7A and 7B.) The fit of the plurality of lugs 46 in the respective complementary slots 49 also prevents rotation of the lock ring 40 relative to the differential case 12.

Figure 7A:
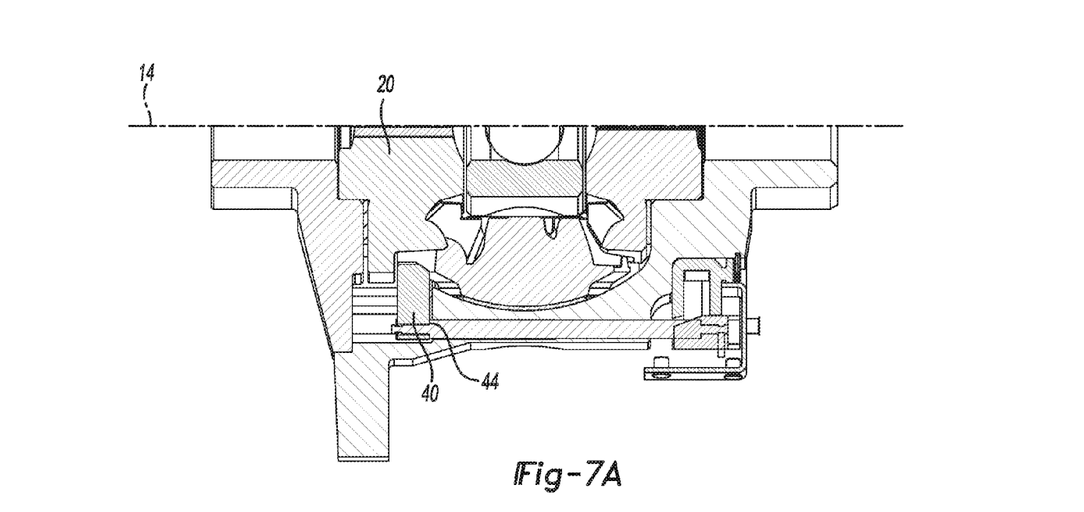
FIG. 7A is a cross-sectional view of an example of the differential assembly with the lock ring in the disengaged position according to the present disclosure.
Figure 7B:
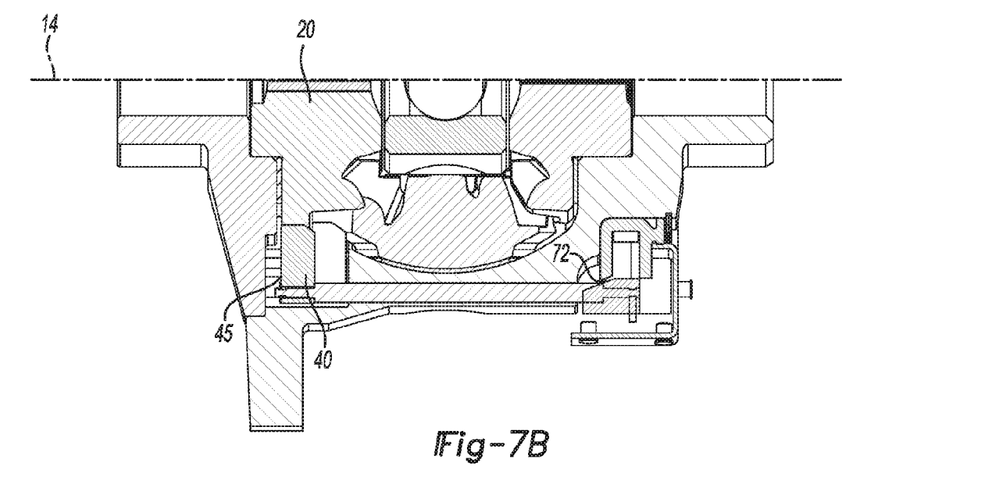
FIG. 7B is a cross-sectional view of an example of the differential assembly with the lock ring in the engaged position according to the present disclosure.

FIG. 7A depicts an example of the present disclosure with the lock ring 40 in the disengaged position 44. FIG. 7B depicts the example shown in FIG. 7A except the the lock ring 40 is in the engaged position 45. In examples of the present disclosure, the second side gear 20 is substantially prevented from rotating relative to the differential case 12 when the lock ring 40 is in the engaged position 45. The second side gear 20 is free to rotate relative to the differential case 12 when the lock ring 40 is in the disengaged position 44. The lock ring 40 has a lock ring thickness 41 parallel to the axis of rotation 14.

The lock ring 40 further includes extension tabs 83 on a quantity of the lugs 48 equal to a quantity of the relay rods 50. The extension tabs 83 each define a relay rod attachment hole 84. Each relay rod 50 is retained in the respective relay rod attachment hole 84 by a clip 85 installed in the annular groove 81 of the respective second post 79 (see FIG. 5B for detail of annular groove 81). In an example, the plurality of lugs 46 is a quantity of nine lugs 48, and the quantity of relay rods 50 is three.

Each lug 48 may have two opposed faces 86 symmetrically arranged about a radial line 87 perpendicular to the axis of rotation 14. An angle 99 between the two opposed faces 86 is from about 28 degrees to about 32 degrees.

Figure 8A:
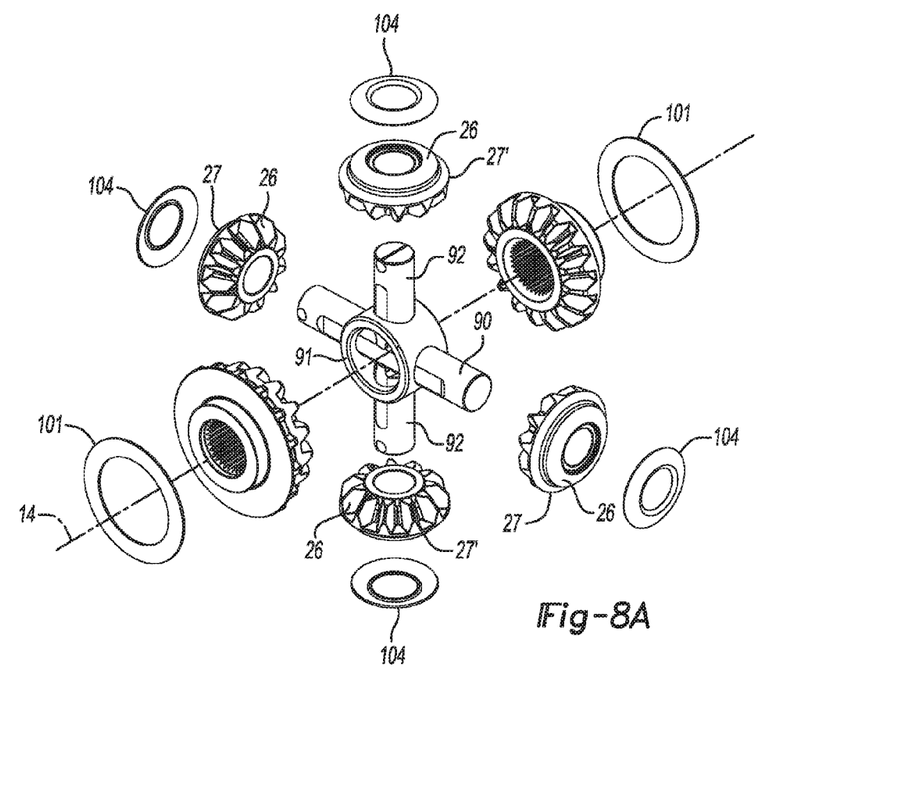
FIG. 8A is a partially exploded perspective view of a differential gear set according to the present disclosure.
Figure 8B:
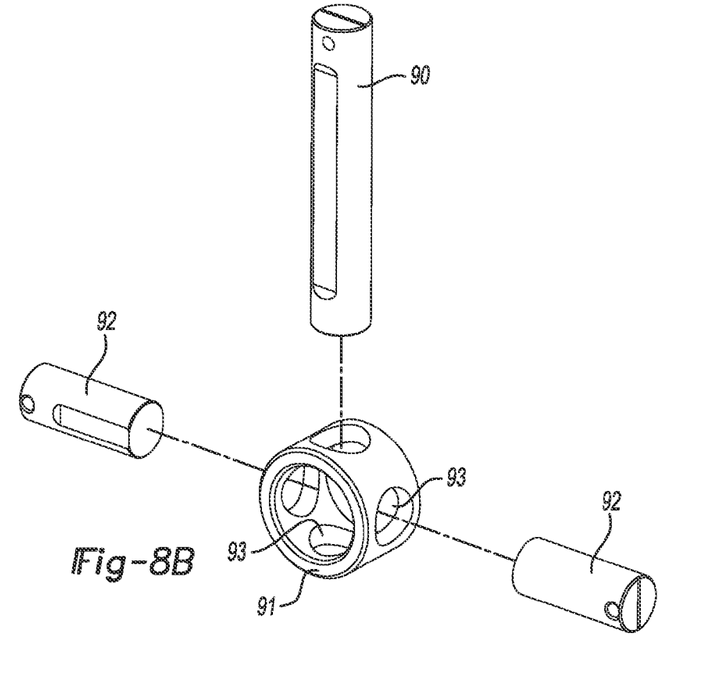
FIG. 8B is an exploded perspective view of an example of a cross shaft according to the present disclosure.

Referring now to FIGS. 8A and 8B, examples of the present disclosure may have a cross-shaft 90 disposed perpendicularly to the axis of rotation 14 of the differential case 12 to support an opposed pair 27 of the at least two pinion gears 26 for rotation of the opposed pair 27 of the at least two pinion gears 26 on the cross-shaft 90. In examples of the present disclosure with a 4-pinion differential, the differential assembly 10 may include a pair of opposed stub shafts 92, each stub shaft 92 being disposed perpendicularly to the cross-shaft 90 and perpendicularly to the axis of rotation 14 of the differential case 12 through a yoke 91. The yoke 91 is disposed around the cross-shaft 90. The yoke 91 has complementary apertures 93 for receiving the stub shafts 92. The pair of opposed stub shafts 92 support another opposed pair 27' of the at least two pinion gears 26.

Figure 9:
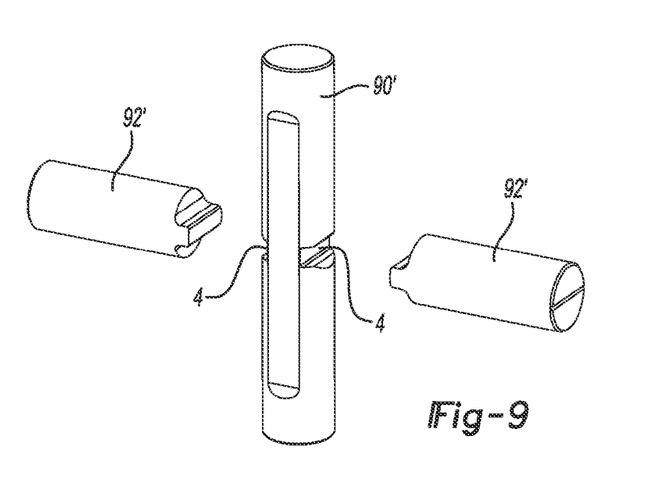
FIG. 9 is an exploded perspective view of another example of a cross shaft according to the present disclosure.

In the example depicted in FIG. 9, the cross-shaft 90' may include two opposed central grooves 4. Each of the opposed central grooves 4 is to receive a complementary tongue disposed on the stub shaft 92'. Examples having the tongue in groove joints depicted in FIG. 9 may or may not include the yoke 91 shown in FIG. 8B.

Figure 10A:
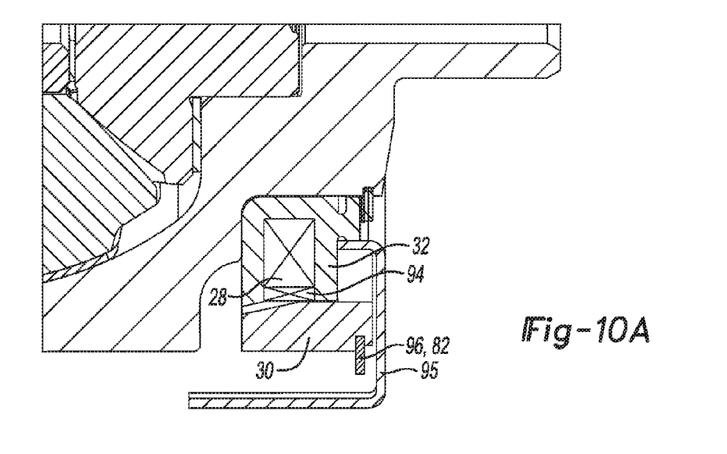
FIG. 10A is an enlarged cross-sectional view of an example of a stator, plunger, and position sensor according to the present disclosure.
Figure 10B:
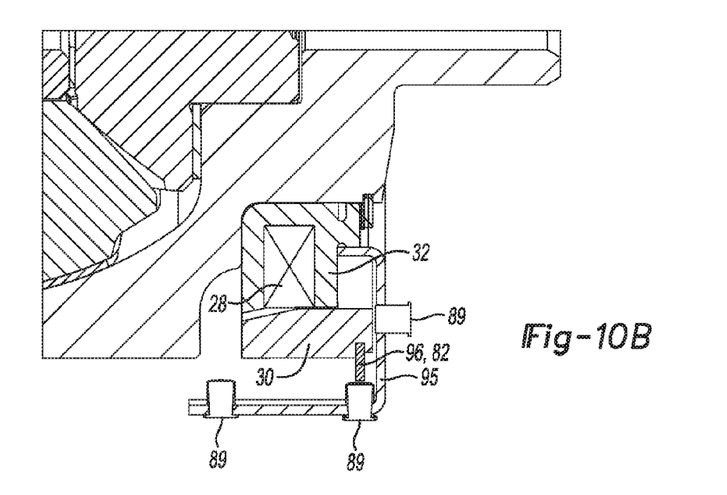
FIG. 10B is an enlarged cross-sectional view of another example of a stator, plunger, and position sensor according to the present disclosure.

Examples of the present disclosure may include a locking differential system 11 that includes the locking differential assembly 10 with the solenoid 28 directly wound on the stator 32 as described above, with control elements described below. The locking differential system 11 may include a plunger position sensor to determine a state of the lock ring 40 by detecting the position of the plunger 30. In an example of a plunger position sensor depicted in FIG. 10A, a secondary coil 94 may be wound around the stator 32 to detect an inductance in the solenoid 28 responsive to a position of the plunger 30. As shown in FIG. 10B, in another example, the plunger position sensor may be a non-contacting position sensor 89 disposed on an anti-rotation bracket 95 connected to the stator 32. In examples of the present disclosure, the non-contacting position sensor may use any non-contacting position sensor technology. For example, non-contacting position sensors based on magnetostriction, magnetoresistance, Hall-Effect, or other magnetic sensing technologies may be included in the locking differential system 11 according to the present disclosure. Further, non-contacting position sensors based on optical, infrared, or fluid pressure sensing may also be used according to the present disclosure. In the example, the non-contacting position sensor 89 detects an axial position of the plunger 30 or a target 96 affixed to the plunger 30. As shown in FIG. 10B, the retention ring 82 may be the target 96. In examples having the retention ring 82 also operative as the target 96, the retention ring 82 may be a double wound laminar ring. An example of a suitable retention ring 82 is a Spirolox® part number WS-587 available from Smalley Steel Ring Company, Lake Zurich, Ill. The double wound laminar ring does not have a gap along the circumference that could cause a magnetic disturbance that could be misinterpreted as axial movement of the plunger 30 by a magnetic position detector. The target 96 may be magnetically responsive to be detectable by the non-contacting position sensor 89. The retention ring 82 may be formed from a magnetically responsive low carbon steel. FIG. 10B shows three alternative locations for the non-contacting position sensor 89. The non-contacting position sensor 89 may be disposed in any single location shown in FIG. 10B, or any combination of a plurality of the non-contacting position sensors 89 may be used for redundancy.

Returning back to FIG. 1, an electrical switch 17 may be disposed on the vehicle 70 to selectably close a circuit 23 to provide electrical power to the solenoid 28. The switch 17 shown in FIG. 1 is a rocker switch, however any switch capable of controlling the flow of power through the solenoid 28 may be used. The switch 17 may be a low current switch that controls a relay or transistor that directly controls power through the solenoid 28. An electronic status indicator 29 may be disposed in the vehicle 70. An electronic driver circuit 25 may be disposed on the vehicle 70 to power the electronic status indicator 29 to indicate a status of the locking differential system 11. In an example, the status may include at least three states. For example, the electronic status indicator 29 may be a selectably illuminated indicator 88, and the status may be indicated by a flash code. To illustrate, the selectably illuminated indicator 88 may include a light emitting diode, incandescent lamp, fluorescent lamp, or other selectably illuminatable light source.

Figure 11:
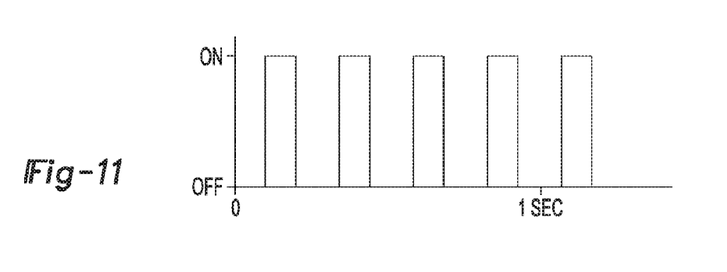
FIG. 11 is time graph depicting an example of a flash code according to the present disclosure.

An example of a flash code may be as follows: the first state is indicated by not illuminating the electronic status indicator 29; the second state is indicated by continuously illuminating the electronic status indicator 29; and the third state is indicated by sequentially illuminating and not illuminating the electronic status indicator 29 with about a 50 percent duty cycle at a frequency between 1 and 20 hertz. FIG. 11 depicts a 50 percent duty cycle at a frequency of about 3 hertz. In FIG. 11, "On" means the electronic status indicator 29 is illuminated, and "Off" means the electronic status indicator 29 is not illuminated. States other than the three states in the example above, for example, error conditions, may be indicated by predetermined sequences of illuminating and not illuminating the electronic status indicator 29. An electronic diagnostic system (not shown) may be connected to the locking differential system 11 to determine if error conditions exist.

In an example, the status is selected from the group consisting of a first state, a second state, and a third state. In the example, the first state is a disengaged state having the electrical switch 17 in an open condition disconnecting power to the solenoid 28, and the lock ring 40 is in the disengaged position 44. The second state is an engaged state having the electrical switch 17 in a closed condition connecting power to the solenoid 28, and the lock ring 40 is in the engaged position 45. The third state is a transition state having the electrical switch 17 in an open condition disconnecting power to the solenoid 28, and the lock ring 40 is in the engaged position 45 (see FIG. 7B); or the electrical switch 17 is in a closed condition connecting power to the solenoid 28, and the lock ring 40 is in the disengaged position 44 (see FIG. 7A). The inventors of the present disclosure believe that indicating the transition state will reduce a tendency for an operator to continue to press a differential lock control button, or press the button harder, while the locking differential system 11 is in the transition state.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 28 degrees to about 32 degrees should be interpreted to include not only the explicitly recited limits of about 28 degrees and about 32 degrees, but also to include individual values, such as 29 degrees, 30 degrees, 31 degrees, etc., and sub-ranges, such as from about 28 degrees to about 31 degrees, etc. Furthermore, when "about" is utilized to describe a value, this is meant to encompass minor variations (up to +/−10%) from the stated value.

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

What is claimed is:

1. A locking differential assembly, comprising:
   a differential case defining an axis of rotation and a gear chamber;
   a first side gear disposed at a first end of the differential case for selectable relative rotation thereto;
   a second side gear disposed at a second end of the differential case opposite the first end for selectable rotation relative to the differential case;
   at least two pinion gears rotatably supported in the gear chamber each of the at least two pinion gears in meshing engagement with the first side gear and the second side gear;
   a solenoid disposed at the first end;
   a plunger selectably magnetically actuatable by the solenoid;
   a lock ring selectably engagable with the second side gear to selectably prevent the second side gear from rotating relative to the differential case;
   at least two relay rods each connected to the plunger and to the lock ring to cause the lock ring to remain a fixed predetermined distance from the plunger;
   side gear dogs defined on an outside diameter of the second side gear parallel to the axis of rotation;
   complementary dogs defined around an inside surface of the lock ring, the complementary dogs selectably engagable with the side gear dogs by translating the lock ring along the axis of rotation from a disengaged position to an engaged position;
   a spring disposed between the differential case and the lock ring to bias the lock ring toward the disengaged position; and
   a plurality of lugs defined on an outside surface of the lock ring distal to the inside surface of the lock ring, each lug to slide in a respective complementary slot defined in the differential case to guide the lock ring translation between the engaged position and the disengaged position and to prevent rotation of the lock ring relative to the differential case;
   wherein the second side gear is substantially prevented from rotating relative to the differential case when the lock ring is in the engaged position, and the second side gear is free to rotate relative to the differential case when the lock ring is in the disengaged position and wherein the lock ring has a lock ring thickness parallel to the axis of rotation; and
   wherein the solenoid is directly wound onto a stator, the stator comprising:
      an annular wall having a longitudinal axis coaxial with the axis of rotation;
      a first stator annular flange extending radially from the annular wall to a first outer diameter; and
      a second stator annular flange extending from the annular wall spaced from the first stator annular flange wherein the second stator annular flange is frustoconical with an inner base annular surface opposite the first stator annular flange and an outer base annular surface distal to the first stator annular flange, wherein the inner base annular surface has an outer edge diameter equal to the first outer diameter and the outer base annular surface has a second outer diameter greater than the first outer diameter, wherein the first stator annular flange, the annular wall and the second stator annular flange define an integral bobbin for the solenoid, and wherein the stator is formed from a ferromagnetic material, wherein the differential case is rotatable relative to the stator about the axis of rotation.

2. The locking differential assembly as defined in claim 1 wherein:
   the annular wall is a cylindrical wall;
   the longitudinal axis is a cylindrical axis;
   the first stator annular flange extends perpendicularly to the cylindrical axis from the cylindrical wall;
   the second stator annular flange extends from the cylindrical wall spaced from the first stator annular flange and parallel to the first stator annular flange; and
   the first stator annular flange, the cylindrical wall and the second stator annular flange define the integral bobbin.

3. The locking differential assembly as defined in claim 1 wherein the plunger comprises:
   a ferromagnetic cylindrical body, including:
      a cylindrical body axis defined by the ferromagnetic cylindrical body to be aligned with the axis of rotation;
      an inner wall having an annular bevel at a beveled end of the ferromagnetic cylindrical body;
      an outer wall having a plunger outer diameter; and
      an annular plunger flange defined at a plunger end distal to the beveled end wherein the annular plunger flange has a plunger flange diameter smaller than the plunger outer diameter;
   an annular notch defined by the ferromagnetic cylindrical body and the annular plunger flange;
   a plurality of relay rod attachment bores defined in the ferromagnetic cylindrical body; and
   a plurality of relay rod access slots each defined in the beveled end of the ferromagnetic cylindrical body at each relay rod attachment bore, wherein the relay rod attachment bore is substantially centered in the relay rod access slot, wherein a shortest distance between the relay rod access slot and the annular notch is equal to the lock ring thickness.

4. The locking differential assembly as defined in claim 3, further comprising:
   a spacer disposed between the plunger and the differential case to prevent the annular bevel of the inner wall from contacting the second stator annular flange.

5. The locking differential assembly as defined in claim 4 wherein the spacer is a threaded rod adjustably screwed into the plunger to set a predetermined gap between the annular bevel and the second stator annular flange.

6. The locking differential assembly as defined in claim 4 wherein the spacer is a plurality of spaced raised bosses on the beveled end of the ferromagnetic cylindrical body.

7. The locking differential assembly as defined in claim 3, the at least two relay rods each comprising:
   a cylindrical rod portion having two ends, the cylindrical rod portion defining a longitudinal rod axis at a center of the cylindrical rod portion;
   a first post and a second post each having a smaller diameter than the cylindrical rod portion defined at a respective one of the two ends, the first post and the second post each concentric with the cylindrical rod portion; and
   an annular groove defined on the first post and the second post, wherein the first and second posts are substantially identical and the relay rod is symmetrical end-to-end, wherein the first post is retained in a respective relay rod attachment bore by a retention ring disposed in the annular notch of the plunger protruding into the annular groove of the first post.

8. The locking differential assembly as defined in claim 7 wherein the lock ring further includes extension tabs on a quantity of the lugs equal to a quantity of the relay rods, the extension tabs each having a relay rod attachment hole therethrough wherein each relay rod is retained in the respective relay rod attachment hole by a clip installed in the annular groove of the respective second post.

9. The locking differential assembly as defined in claim 8 wherein the plurality of lugs is a quantity of nine lugs and the quantity of relay rods is three.

10. The locking differential assembly as defined in claim 1 wherein:
the plunger is fixed for rotation with the differential case; and
the plunger is selectably translatable relative to the differential case along the axis of rotation.

11. The locking differential assembly as defined in claim 1 wherein:
each lug has two opposed faces symmetrically arranged about a radial line perpendicular to the axis of rotation; and
an angle between the two opposed faces is from about 28 degrees to about 32 degrees.

12. The locking differential assembly as defined in claim 11 wherein the plurality of lugs is a quantity of nine lugs.

13. The locking differential assembly as defined in claim 1, further comprising:
a cross-shaft disposed perpendicularly to the axis of rotation of the differential case to support an opposed pair of the at least two pinion gears for rotation of the opposed pair of the at least two pinion gears on the cross-shaft.

14. The locking differential assembly as defined in claim 13, further comprising:
a pair of opposed stub shafts disposed perpendicularly to the cross-shaft and perpendicularly to the axis of rotation of the differential case through a yoke, wherein:
the yoke is disposed around the cross-shaft;
the yoke has complementary apertures for receiving the stub shafts; and
the pair of opposed stub shafts support an other opposed pair of the at least two pinion gears.

15. A locking differential system, comprising:
the locking differential assembly as defined in claim 1;
a plunger position sensor to determine a state of the lock ring by detecting a position of the plunger;
an electrical switch to selectably close a circuit to provide electrical power to the solenoid;
an electronic status indicator; and
an electronic driver circuit for powering the electronic status indicator to indicate a status of the locking differential system wherein the status includes at least three states.

16. The locking differential system as defined in claim 15 wherein the electronic status indicator is a selectably illuminated indicator and the status is indicated by a flash code.

17. The locking differential system as defined in claim 15 wherein:
the status is selected from the group consisting of a first state, a second state, and a third state;
the first state is a disengaged state having the electrical switch in an open condition to disconnect power to the solenoid and the lock ring is in the disengaged position;
the second state is an engaged state having the electrical switch in a closed condition connecting power to the solenoid and the lock ring is in the engaged position; and
the third state is a transition state having the electrical switch in an open condition disconnecting power to the solenoid and the lock ring is in the engaged position or the electrical switch is in a closed condition connecting power to the solenoid and the lock ring is in the disengaged position.

18. The locking differential system as defined in claim 15 wherein:
the electronic status indicator is a selectably illuminated indicator;
the at least three states include a first state, a second state, and a third state;
the first state is indicated by not illuminating the electronic status indicator;
the second state is indicated by continuously illuminating the electronic status indicator; and
the third state is indicated by sequentially illuminating and not illuminating the electronic status indicator with about a 50 percent duty cycle at a frequency between 1 hertz and 20 hertz.

19. The locking differential system as defined in claim 15, further comprising
a secondary coil wound around the stator to detect an inductance in the solenoid responsive to the position of the plunger.

20. The locking differential system as defined in claim 19 wherein:
the annular wall is a cylindrical wall;
the longitudinal axis is a cylindrical axis;
the first stator annular flange extends perpendicularly to the cylindrical axis from the cylindrical wall;
the second stator annular flange extends from the cylindrical wall spaced from the first stator annular flange and parallel to the first stator annular flange; and
the first stator annular flange, the cylindrical wall and the second stator annular flange define the integral bobbin.

21. The locking differential system as defined in claim 15, further comprising
a non-contacting position sensor disposed on an anti-rotation bracket connected to the stator, wherein the non-contacting position sensor is to detect an axial position of the plunger or a target affixed to the plunger.

22. The locking differential system as defined in claim 21 wherein the non-contacting position sensor is a Hall-Effect position sensor.

* * * * *